United States Patent
Ke et al.

(10) Patent No.: US 11,451,329 B2
(45) Date of Patent: Sep. 20, 2022

(54) METHOD AND APPARATUS OF LOW-COMPLEXITY PATTERN DEPENDENT LOOKUP TABLE PRE-COMPENSATION

(71) Applicants: Jianhong Ke, Ottawa (CA); Chuandong Li, Ottawa (CA); Xuefeng Tang, Kanata (CA)

(72) Inventors: Jianhong Ke, Ottawa (CA); Chuandong Li, Ottawa (CA); Xuefeng Tang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/157,691

(22) Filed: Jan. 25, 2021

(65) Prior Publication Data

US 2022/0239407 A1 Jul. 28, 2022

(51) Int. Cl.
*H04L 1/00* (2006.01)

(52) U.S. Cl.
CPC .......... *H04L 1/0034* (2013.01); *H04L 1/0016* (2013.01)

(58) Field of Classification Search
CPC .................. H04L 1/0034; H04L 1/0016
See application file for complete search history.

(56) References Cited

U.S. PATENT DOCUMENTS

| | | | |
|---|---|---|---|
| 6,657,566 B1 * | 12/2003 | Risbo | H03M 5/08 375/242 |
| 9,495,582 B2 * | 11/2016 | Guissin | G06T 5/002 |
| 10,432,436 B1 * | 10/2019 | Rengarajan | H04L 27/01 |
| 2001/0054974 A1 * | 12/2001 | Wright | H03F 1/3247 341/144 |

* cited by examiner

*Primary Examiner* — Janice N Tieu (57) ABSTRACT

Methods and systems for performing signal pre-correction of a transmission signal comprising a sequence of symbols using a Pattern Dependent Look-up Table (PDLUT) containing one or more distortion correction values. Upon accessing a distortion correction value from the PDLUT for a symbol of the sequence of symbols, the accessed distortion correction value is quantized into one or more quantized values according to one or more quantizations, thereby reducing the bit-width of the distortion correction value. The transmission signal and the distortion correction value with reduced bit-width may undergo linear correction compensation, such as through a finite impulse response (FIR) filter, independent of one another, where the one or more quantized correction values with reduced bit-width reduce a number of calculation steps performed during linear correction compensation resulting in power savings. The linearly compensated quantized values and the linearly compensated signal are combined to form a pre-corrected signal.

20 Claims, 9 Drawing Sheets

METHOD AND APPARATUS OF LOW-COMPLEXITY PATTERN DEPENDENT LOOKUP TABLE PRE-COMPENSATION

FIELD

The present invention generally relates to communication technologies, in particular, to a method and apparatus for signal pre-compensation using lookup table during digital signal processing.

BACKGROUND

Communication signals transmitted over wireless, wired, or optical channels are subject to various impairments, especially at high baud-speed (or high baud rate), including pattern-dependent distortions or non-linear inter-symbol interference with memory introduced by transmitter components such as DAC, Radio Frequency (RF) amplifiers, and Mach-Zender modulators. Specifically, the nonlinear effects of each transmitter components interact with the frequency responses of each individual components that when combined, results in a nonlinear distortion with memory length that in turn causes non-linear degradation of amplitude and a phase that are based on a symbol sequence in a signal received by the optical communications system receiver. Such nonlinear distortions have been recognized as one of the major impairments that limits the transceiver performance, especially for high-order modulation formats at high baud rates. The nonlinear distortion typically exhibits a strong dependence on data patterns with a considerable memory length.

The transmitter nonlinear distortion could be mitigated or compensated by using nonlinear digital pre-distortion (DPD) algorithms, which is normally based on an adaptive Volterra Finite Impulse Response (FIR) filter or machine-learning based artificial neuro network (ANN). However, these methods may significantly increase the implementation complexity and power consumption of an Application Specific Integrated Circuit (ASIC) Digital Signal Processing (DSP) processor.

In a compromise between performance and implementation to perform transmitter nonlinearity compensation. Specifically, before electrical/optical conversion and transmission by using an optical link of a communications system, an input communication signal is processed (or pre-compensated) in an electrical domain to compensate for signal distortion correction introduced by non-linearity before transmission. For example, an electrical input signal is digitally processed by using a compensation module, so as to generate a pre-compensated (or pre-corrected) electrical signal, and an optical source is modulated by using the corresponding pre-compensated electrical signal, so as to generate a pre-compensated optical signal transmitted in the optical communications system.

A lookup table (LUT) may be generated by calculating distortion correction values corresponding to each symbol sequence in a preset sequence of N symbols, and storing each calculated distortion correction value with an associated lookup table index. The distortion correction values are dependent upon the specific pattern of the symbol sequence, thus the resulting LUT is also referred to as a Pattern Dependent Lookup Table (PDLUT).

Conventional PDLUT distortion correction values are typically of long-bit resolution (i.e. 8 bits or longer), the required bit resolution of an FIR filter configured to receive the distortion correction value is increased to accommodate the long-bit input in order to preserve an accurate distortion correction value. This not only increases the calculation complexity required of the FIR filter, but also significantly increases power consumption of the DSP processor. For ultra-high-speed (i.e. 800 Gbps and beyond) short-reach and Data Center Interconnect (DCI) applications, the power consumption of a transceiver modules must comply with strict standards, which poses a challenge to DSP algorithms. Therefore, an improved PDLUT with reduced complexity and power consumption is highly desired to address the issue of transmitter nonlinear distortion.

Accordingly, there is a need for improved PDLUT pre-compensation method and apparatus that is more efficient with less power consumption.

SUMMARY

The present disclosure provides a low-power and efficient low-complexity PDLUT pre-compensation method and apparatus for the pre-compensation of a transmission signal comprising a sequence of symbols whereby the sequence of symbols are used to generate index values for accessing distortion correction values stored in a PDLUT. The distortion correction value accessed from the PDLUT is quantized into one or more quantized values in accordance with one or more quantizations. Each of the quantized values, as well as the original transmission signal, are configured to be received by a corresponding FIR filter for linear compensation. Each FIR filter has a number of input levels (also referred to as quantization levels) configured reduce the number of computational steps performed by the FIR filter and thereby reduce power consumption. The linearly compensated quantized distortion correction value may be applied to the linearly compensated original transmission signal to provide a pre-compensated signal for transmission.

According to an aspect, there is provided a method of pre-correction of a signal comprising a sequence of symbols using a Pattern Dependent Look-up Table (PDLUT) containing one or more distortion correction values, the method comprising: accessing a distortion correction value from the PDLUT for a symbol of the sequence of symbols; quantizing the accessed distortion correction value into one or more quantized values according to one or more quantizations to reduce a bit-width of the distortion correction value; applying linear correction compensations to the one or more quantized values and the signal separately, where the one or more quantized correction values with reduced bit-width reduce a number of calculation steps performed during linear correction compensation; and combining the linearly compensated quantized values and the linearly compensated signal into a pre-corrected signal.

According to another aspect, there is provided a digital signal processor (DSP) for a transmitter, comprising: a processor configured to: access a distortion correction value in a PDLUT for a symbol of a sequence of symbols to be transmitted by the transmitter; quantize the accessed distortion correction value into one or more quantized values according to one or more quantizations to reduce a bit-width of the distortion correction value; one or more FIR filters configured to apply linear correction compensation to the one or more quantized values and the sequence of symbols, where the one or more quantized correction values with reduced bit-width reduce a number of calculation steps performed during linear correction compensation; and an adder configured to combine the linearly compensated quantized values and the linearly compensated sequence of symbols into a pre-corrected signal.

In any of the above aspects, the quantizing may further comprise: quantizing the accessed distortion correction value into a first quantized value according to a first quantization; and quantizing a second portion of the distortion correction value into a second quantized value according to a second quantization, wherein the second portion of the distortion correction value is a difference between the accessed distortion correction value and the first quantized value.

In any of the above aspects, the applying may further comprise: providing the first quantized value to a first finite impulse response (FIR) filter having a first plurality of input levels; providing the second quantized value to a second FIR filter having a second plurality of input levels; and providing the signal to a third FIR filter.

In any of the above aspects, the accessing may further comprise: for each symbol in the sequence of symbols, selecting a number of consecutive symbols with the each symbol as a center symbol; forming an index based on the number of symbols; and retrieving, using the index, a distortion correction value from the PDLUT.

In any of the above aspects, the one or more quantized values of the one or more distortion correction values may be pre-calculated and stored into the PDLUT, and the pre-calculated quantized values are accessed and applied to the signal directly.

In any of the above aspects, the quantizing may include one quantization and linear compensation is applied by a FIR filter having an odd number of input levels, the quantizing may further comprise: determining a scale factor representative of a distortion correction value difference between adjacent input levels of the FIR filter as $$scaleFactor = \frac{\max(\Delta) - \min(\Delta)}{N_{level} - 1},$$

where $\max(\Delta)$ is a maximum distortion correction value, $\min(\Delta)$ is a minimum distortion correction value, and $N_{level}$ is the odd number of input levels of the FIR filter; and determining the quantized value $$(\Delta_Q) \text{ as } \Delta_Q = \text{ROUND}\left(\frac{\Delta}{scaleFactor}\right) \cdot scaleFactor,$$

where ROUND is a rounding function, and $\Delta$ is the accessed distortion correction value.

In any of the above aspects, the quantizing may include one quantization and linear compensation is applied by a FIR filter having an even number of input levels, the quantizing may further comprise: determining a scale factor representative of a distortion correction value difference between adjacent input levels of the FIR filter as $$scaleFactor = \frac{\max(\Delta) - \min(\Delta)}{2N_{level}},$$

where $\max(\Delta)$ is a maximum distortion correction value, $\min(\Delta)$ is a minimum distortion correction value, and $N_{level}$ is the even number of input levels; and determining the quantized value $$(\Delta_Q) \text{ as } \Delta_Q = \left(\text{ROUND}\left(\frac{\frac{\Delta}{scaleFactor} - 1}{2}\right) \cdot 2 + 1\right).$$

scaleFactor, where ROUND is a rounding function, and $\Delta$ is the accessed distortion correction value.

In any of the above aspects, the quantizing the first portion of the distortion correction value may include determining a first scale factor representative of a distortion correction value difference between adjacent quantization levels of the first quantization as $$scaleFactor_1 = \frac{\max(\Delta) - \min(\Delta)}{N_{level\_1} - 1},$$

where $\max(\Delta)$ is a maximum distortion correction value, $\min(\Delta)$ is a minimum distortion correction value, and $N_{level}$ is a first plurality of quantization levels of the first quantization; and determining the first quantized value $$(\Delta_{Q1}) \text{ as } \Delta_{Q1} = \text{ROUND}\left(\frac{\Delta}{scaleFactor_1}\right) \cdot scaleFactor_1,$$

where ROUND is a rounding function, and A is the accessed distortion correction value.

In any of the above aspects, the first plurality of quantization levels may be an even or odd number of levels.

In any of the above aspects, the quantizing the second portion of the distortion correction value may include determining a second scale factor representative of a distortion correction value difference between adjacent quantization levels of a second quantization as $$scaleFactor_2 = \frac{scaleFactor_1}{N_{level2}},$$

where $N_{level2}$ is the second plurality of quantization levels of the second quantization; determining a distortion correction value as $rCorrection = \Delta - \Delta_{Q1}$; and determining the second quantized value as $$\Delta_{Q2} = \text{ROUND}\left(\frac{rCorrection}{scaleFactor_2}\right) \cdot scaleFactor_2,$$

where ROUND is a rounding function.

In any of the above aspects, the second plurality of quantization levels may be an odd number of levels.

In any of the above aspects, the second plurality of quantization levels may include a 0 quantization level, and remaining levels of the second plurality of levels are symmetrically distributed about the 0 quantization level.

In any of the above aspects, the quantizing the second portion of the distortion correction value may include determining a second scale factor representative of a distortion correction value difference between adjacent quantization levels of a second quantization as $$scaleFactor_2 = \frac{scaleFactor_1}{2N_{level2}},$$

where $N_{level2}$ is a second plurality of quantization levels of the second quantization; determining a distortion correction value as $rCorrection = \Delta - \Delta_{Q1}$; and determining the second quantized value as $$\Delta_Q = \left( ROUND\left( \frac{\frac{rCorrection}{scaleFactor} - 1}{2} \right) \cdot 2 + 1 \right) \cdot scaleFactor_2,$$

where ROUND is a rounding function.

In any of the above aspects, the second plurality of quantization levels may be an even number of levels.

In any of the above aspects, wherein the quantizing step may include three or more quantizations, the quantization levels of each of the three or more quantizations may be determined as $N_{level} = (N_{level1} - 1)(N_{level2}) \ldots (N_{leveln}) + 1$, where $N_{level}$ is a plurality of quantization levels of a single quantization, and $N_{leveln}$ is the number of quantization levels of an $n^{th}$ quantization of the three or more quantizations.

In any of the above aspects, the single quantization and the multiple quantization may achieve a same accuracy.

In any of the above aspects, the processor may be further configured to quantize a first portion of the distortion correction value into a first quantized value according to a first quantization; and quantize a remaining portion of the distortion correction value into a second quantized value according to a second quantization, wherein the second portion of the distortion correction value is a difference between the accessed distortion correction value and the first quantized value.

In any of the above aspects, the one or more FIR filters may include: a first FIR filter having a first plurality of input levels configured to receive the first quantized value; a second FIR filter having a second plurality of input levels configured the received to the second quantized value.

In any of the above aspects, the adder may be any one of a half adder, full adder, ripple-carry adder, carry-look-ahead adder, Brent-Kung adder, Kogge-Stone adder, carry-save adder, carry-select adder, and carry-skip adder.

At least some of the above aspects may advantageously permit a reduced bit-width of a distortion correction value such that when applied to a FIR filter for linear compensation, the computation complexity and power consumption may be reduced, which may allow transmitter DSP circuits to perform pre-correction of transmission signal more efficiently with lower power consumption.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Unless otherwise defined, all technical and scientific terms used herein have the same meaning as commonly understood by one of ordinary skill in the art to which the described embodiments appertain.

Figure 1:
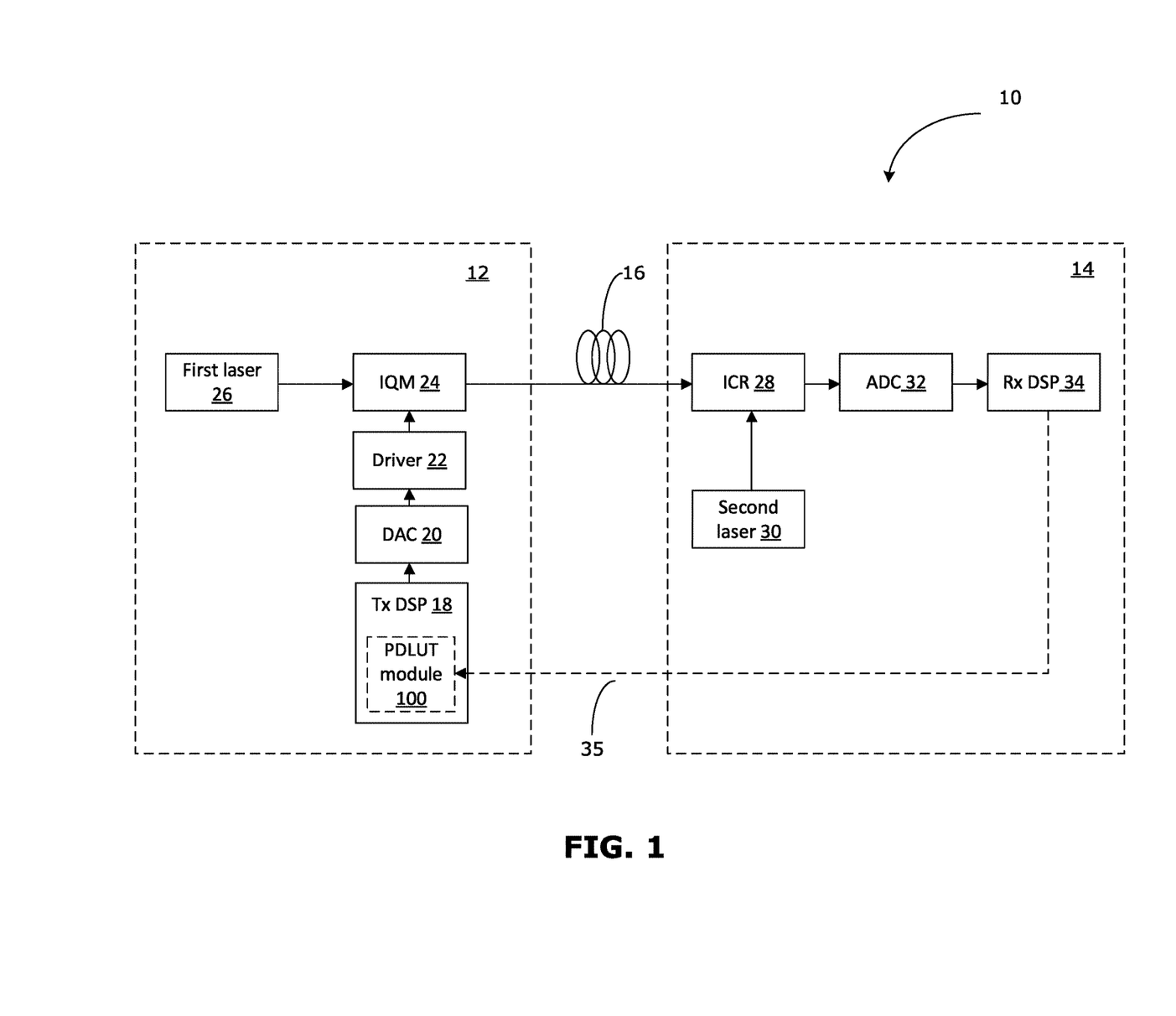
FIG. 1 is a high-level block diagram of an optical communication system according to the present disclosure.

FIG. 1 is a high-level block diagram of an optical communication system 10. As shown, the system 10 includes a transmitter 12 and a receiver 14. The transmitter 12 further includes a transmitter (Tx) DSP 18, a digital to analog convertor (DAC) 20, a driver 22, an in-phase quadrature modulator (IQM) 24, and a first laser 26. The coherent system 10 also includes a communication link (such as a fiber optic link) 16 interconnecting the transmitter 12 and the receiver 14. The receiver 14 includes a coherent receiver (such as an integrated coherent receiver (ICR)) 28, a second laser 30, an analogue to digital convertor (ADC) 32, and a receiver (Rx) DSP 34. It is understood that other elements may be present but not illustrated for the purpose of simplicity.

The Tx DSP 18 is configured to receive a digital signal and perform up-sampling and pre-compensation of the received digital signal, including pre-compensation performed by PDLUT module 100. As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, an application specific integrated circuit (ASIC), field programmable gate array (FPGA), or a system on a chip (SoC) or another hardware processing circuit.

The DAC 20 is configured to convert the up-sampled and pre-compensated digital signal to an analog signal. The analog signal is amplified by the driver 22. The amplified analog signal is then modulated to the output of the first laser 26 via IQM 24 to convert the amplified analog signal into an optical signal having an X-polarization channel and a Y-polarization channel.

The X- and Y-polarized channels of the optical signal are transmitted through communication link 16. It is understood that although the communication link 16 may be configured to transmit an optical signal, in other embodiments, the communication link 16 may also transmit the analog signal as a radio frequency signal in a wireless medium.

The X- and Y-polarized channels of the optical signal are detected by ICR 28 with a local oscillator that includes a second laser 30. In so doing, the ICR 28 converts the optical signal to X- and Y-polarized electrical signal channels. The ADC 32 is configured to convert the X- and Y-polarized analog electrical signal channels to X- and Y-polarized digital signal channels. The X- and Y-polarized digital signal channels are then forwarded to the Rx DSP 34 for various digital signal processing measures. It is understood that other elements may be present but not illustrated for the purpose of simplicity.

Figure 2A:
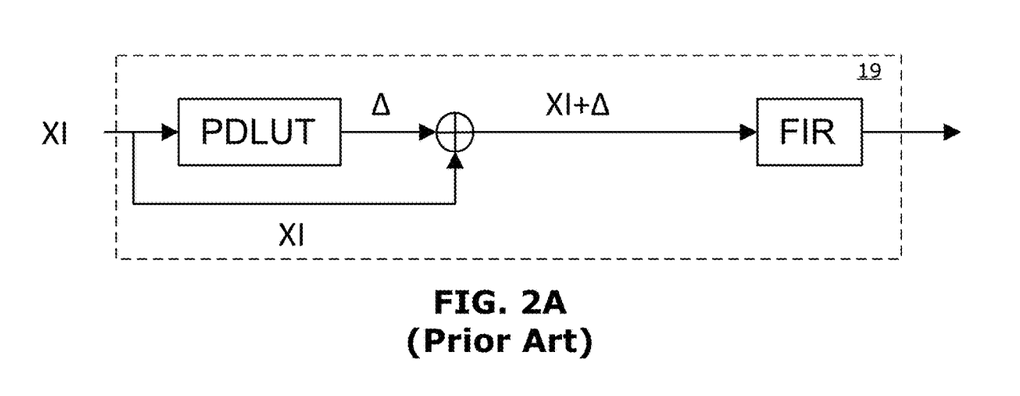
FIG. 2A is a high-level block diagram showing signal propagation in a conventional PDLUT compensation method.

FIG. 2A shows a high-level block diagram showing signal propagation in a conventional PDLUT compensation method that may be implemented at PDLUT compensation module 100. For coherent communication, a Tx signal may include 4 sets of symbol sequences: XI, XQ, YI, and YQ, each of which corresponds to an in-phase and a quadrature of the X-polarization, and an in-phase and a quadrature of the Y-polarization, respectively. In FIG. 2A, the Tx signal is shown to include the XI component for brevity. As shown, the Tx signal including a sequence of symbols (XI) is first passed to the PDLUT module 100, which generates a pattern-dependent non-linear distortion correction value ($\Delta$) as discussed in more detail below and applied to the Tx signal to derive a pre-corrected signal. Then the pre-corrected symbol (XI+$\Delta$) is passed through a FIR filter for linear compensation. The output of the FIR filter may undergo further processing in the Tx DSP 18 before being transmitted onto other components, such as DAC 20 in the illustrated embodiment.

Figure 2B:
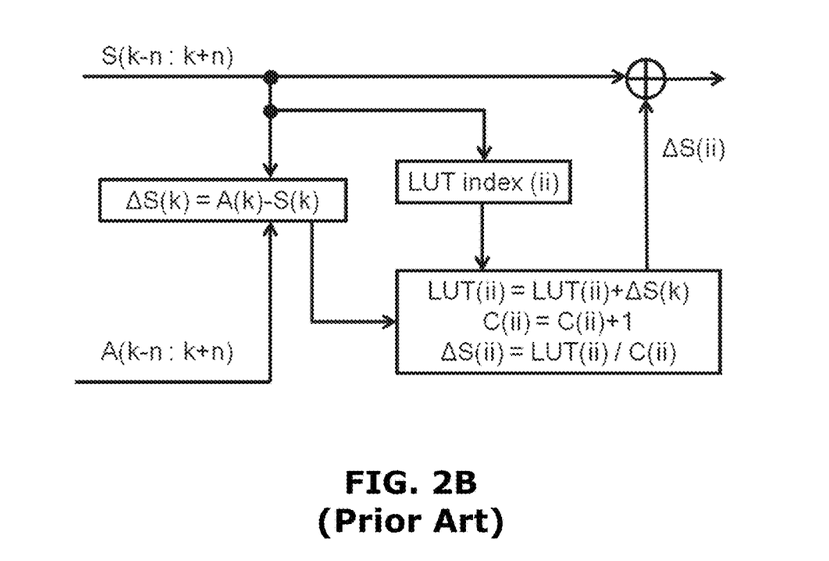
FIG. 2B is a high-level block diagram of a conventional PDLUT pre-correction system.

FIG. 2B is a high-level block diagram of a conventional PDLUT pre-correction system 50 that is typically implemented at PDLUT module 100. The PDLUT distortion correction values may be obtained based on a calibration process by comparing a received symbol sequence post Rx DSP against the original transmitted symbol sequence from the Tx DSP. By way of an example, for a under corrected symbol with index k, consecutive symbols with memory length 2n+1 centered around symbol k, S(k−n:k+n), are used to generate or access the corresponding distortion correction value for symbol k. For conventional PDLUTs, the memory length is normally an odd number (i.e. 2n+1) as shown in FIG. 2B. However, it is understood that the symbol sequence may have an even number of symbols. Continuing with the example, a corresponding received symbol sequence after all Rx DSP processing may be defined as A(k−n:k+n), which may contain certain pattern dependent distortions. The difference (or the error) between S(k−n:k+n) and A(k−n:k+n) on a symbol-wise resolution may be determined as $\Delta$S(k). A PDLUT (also referred to as a LUT) contains the non-linear correction error value for the center symbol within each symbol sequence S(k−n:k+n). The LUT amplitude corrections may be initialized to all zeroes. A sliding window is used to identify the consecutive sequence of symbols to form the index value of the LUT (i.e. index(ii)). As the window traverses forward through the received symbol sequence, each time a symbol sequence appears, the correction error value $\Delta$S(k) is accumulated at the corresponding LUT index. A LUT counter (C) is used to track the number of updates for each specific entry and incremented each time by 1 (i.e. C(ii)=C(ii)+1). The average correction error value determined as $\Delta$S(ii)=LUT (ii)/C(ii) is applied to the actual received sequence A(k−n:k+n) to produce the pre-distorted output amplitude. In practice, the LUT correction could be pre-calculated or determined in real time based on consideration for the relevant tradeoffs between performance and implementation complexity. However, the value of $\Delta$S(k) is often expressed as a decimal value smaller than that of each individual symbol. Hence, the value of $\Delta$S(k) must be expressed using additional bits, which requires more bit-wise operation in all subsequent steps resulting longer computational time.

Figure 3:
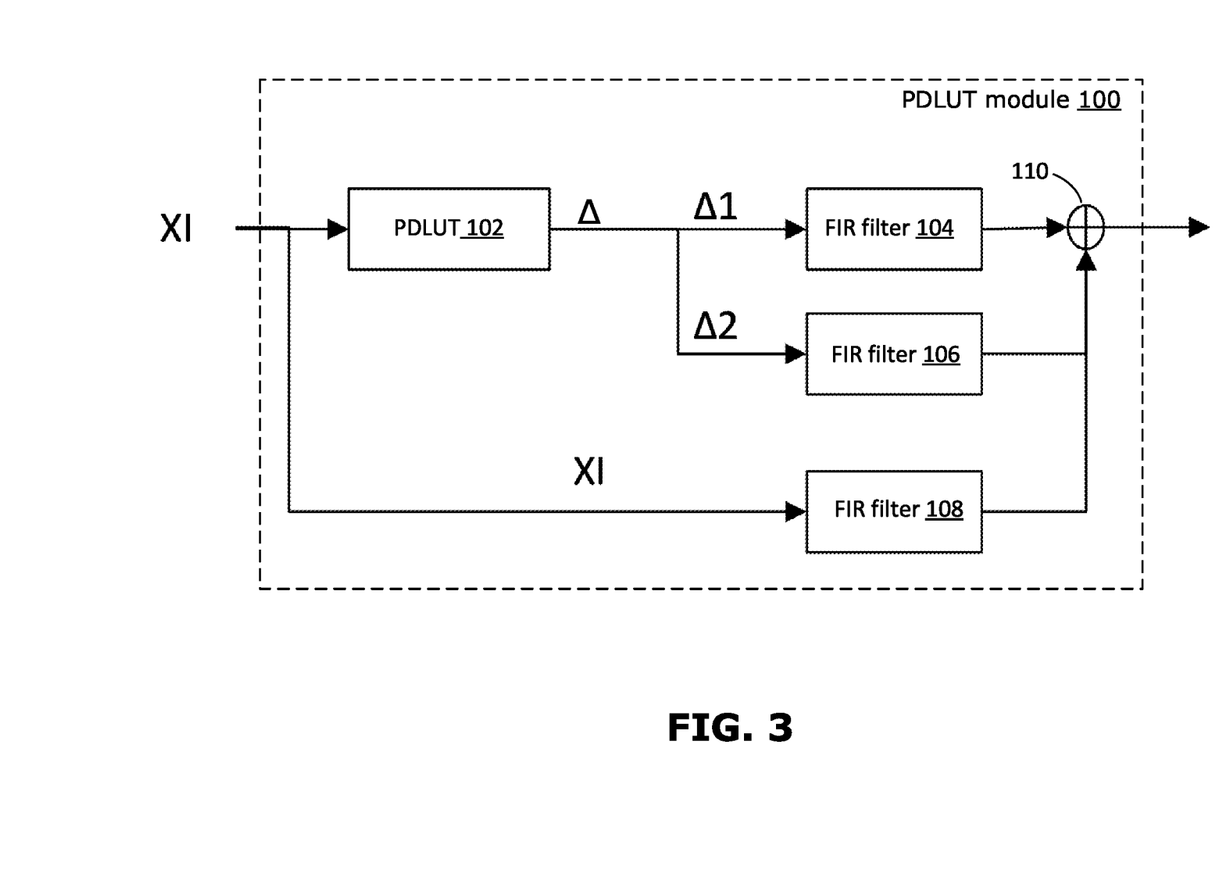
FIG. 3 is a block diagram of a two-stage PDLUT module in accordance with the present disclosure.

FIG. 3 shows a block diagram of a two-stage PDLUT module 100 in accordance with the present disclosure. The PDLUT module 100 includes PDLUT 102, FIR filters 104, 106, and 108, along with an adder 110.

The PDLUT module 100 receives a signal (XI) comprising a sequence of N-symbols as an input. The input signal XI is converted into an index value for accessing the PDLUT 102. In some embodiments, each different N symbol sequence corresponds to an index (or address) and the correction of the specific sequence is saved under this index. The total number of index is LAN, which corresponds to the LUT size. L is the number of possibilities of each symbol, for example, for QPSK, L=2, for 16QAM, L=4, for 64QAM, L=8, N is a quantity of symbols in the N symbol sequence which corresponding to the memory length, When N is an odd number, the center symbol is the $(N+1)/2^{th}$ symbol in the symbol sequence, and when N is an even number, the center symbol is the $N/2^{th}$ symbol or the $N/2+1^{th}$ in the symbol sequence. Then, each M-bit word is used as an index value for accessing a corresponding register of a lookup table 102, so as to read a non-linear correction error value stored in the register.

A PDLUT 102 is configured to maintain a plurality of distortion correction values generated from a calibration process similar to those described with reference to FIG. 2B.

FIR filters 104 and 106 are each configured to receive the first and second quantized value, respectively. FIR filter 108 is configured to receive the input signal (XI). In some embodiments, the FIR filters 104, 106, and 108 performs linearly compensation on each of the first quantized value, the second quantized value, and the input signal XI, respectively, independent of one another. For each of the FIR filters 104, 106, and 108 an input signal is passed through a series of delay latches. A junction at the output of each latch is referred to as a tap. Each tap (except the last one) feeds into both the next latch of the series of latches, as well as to an input of a multiplier. As the sampled digital signal data is fed into the series of delay latches, the taps contain a series of consecutive samples of the input signal. A respective multiplier multiplies each of these samples by its corresponding tap weight stored by a corresponding weight register. The succession of tap weights can be chosen to obtain some desired filtering characteristic, such as overcoming bandwidth limitation imposed by components on the data path, to perform the Nyquist pulse shaping to improve spectral efficiency, or to compensate impairments such as time skew and power imbalance. The multiplication products of multipliers through are then conveyed to an accumulator array that sums these outputs to provide the final output of the FIR filter. After each multiplication and addition step, the digital signal data stored in each latch is moved to the next latch in sequence and a new digital signal sample is latched into first latch.

Adder 110 may combine the outputs of the FIR filters 104, 106, and 108 as a pre-corrected signal that may be forwarded to other components of the transmitter 12 prior to transmitting the signal to receiver 14. The adder 110 may be implemented in the arithmetic logic unit (ALU) of a processor. The adder 110 may be implemented as a half adder, full adder, ripple-carry adder, carry-look-ahead adder, Brent-Kung adder, Kogge-Stone adder, carry-save adder, carry-select adder, carry-skip adder, or any other types of adder.

It is understood that although a two-step PDLUT module 100 is shown, the module 100 may be extended to a single-step or multi-step PDLUT module 100 as may be apparent from the present disclosure.

Figure 4:
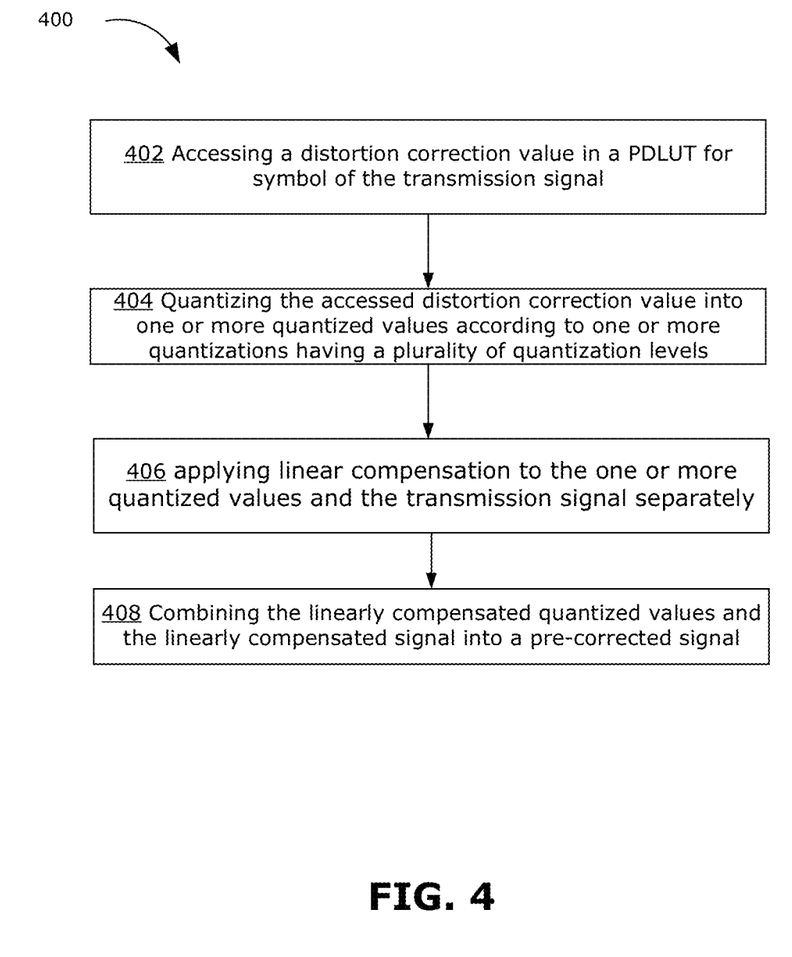
FIG. 4 is a flowchart of a single-step PDLUT compensation method in accordance with exemplary embodiments of the present disclosure.

FIG. 4 is a flowchart of a single-step PDLUT compensation method 400 in accordance with exemplary embodiments of the present disclosure. Method 400 may be implemented by hardware, software, or hardware and software means at PDLUT compensation module 100.

At 402, an input transmission signal sequence is inputted to a PDLUT 102. For each symbol in the transmission signal, a sequence of N consecutive symbols within the transmission signal is used to generate an index for accessing a pre-correction error value stored in the PDLUT 102 where each symbol serves as a center symbol of the sequence of symbols. When N is an odd number, the center symbol is the $(N+1)/2^{th}$ symbol in the symbol sequence, and when N is an even number, the center symbol is the $N/2^{th}$ symbol or the $(N/2+1)^{th}$ in the symbol sequence. By way of a non-limiting illustrative example, for a sequence of 3 symbols (S1, S2, and S3) in a transmission signal with 16 QAM, there are 4 possibilities (XI, XQ, YI, and YQ) for reach symbol S∈[−3, −1, 1, 3]. Then the index may be calculated as $$\text{index} = B_1 \cdot 4^2 + B_2 \cdot 4 + B_3$$

$$\text{where } B_i = \frac{S_i + 3}{2}, B \in [0, 1, 2, 3].$$

Then, the generated index is used for accessing a corresponding register of a PDLUT 102 to read a non-linear correction error value.

At 404, the distortion correction value accessed from PDLUT 102 is quantized into a quantized value according to a quantization so as to reduce the bit-width of the distortion correction value.

The FIR filter input levels ($N_{level}$), also referred to as quantization levels of the corresponding quantization. In some embodiments, the number of FIR filter input levels is an odd number. The input levels are symmetrically distributed about the 0 level. A scale factor, representative of the amount of incremental increase in distortion correction value between adjacent quantization levels may be determined in accordance with Equation (1) as:

$$\text{scaleFactor} = \frac{\max(\Delta) - \min(\Delta)}{N_{level} - 1} \qquad \text{Equation (1)}$$

Where max(Δ) is the maximum distortion correction value stored in the PDLUT 102, min(Δ) is the minimum distortion correction value stored in the PDLUT 102, and $N_{level}$ is the number of input levels of the FIR filter configured to receive the quantized value, also referred to as the quantization levels. The quantized value may be determined in accordance with Equation (2) as:

$$\Delta_Q = \text{ROUND}\left(\frac{\Delta}{\text{scaleFactor}}\right) \cdot \text{scaleFactor} \qquad \text{Equation (2)}$$

Where Δ is the distortion correction value accessed from PDLUT 102, and "ROUND" is a function rounding to the nearest integer, and $\Delta_Q$ is the quantized value. It is understood that other rounding methods, such as rounding to the near power of two so as to enable simple bit shifting and any other methods of rounding may be adopted. The maximum quantization error (or rounding error) is less than the scale factor.

In some other embodiments, the FIR filter may have an even number of input levels ($N_{level}$). In such case, the scale factor and the quantized value may be determined as follows:

$$\text{scaleFactor} = \frac{\max(\Delta) - \min(\Delta)}{2N_{level}} \qquad \text{Equation (3)}$$

$$\Delta_Q = \left(\text{ROUND}\left(\frac{\frac{\Delta}{\text{scaleFactor}} - 1}{2}\right) \cdot 2 + 1\right) \cdot \text{scaleFactor} \qquad \text{Equation (4)}$$

Figure 5A:
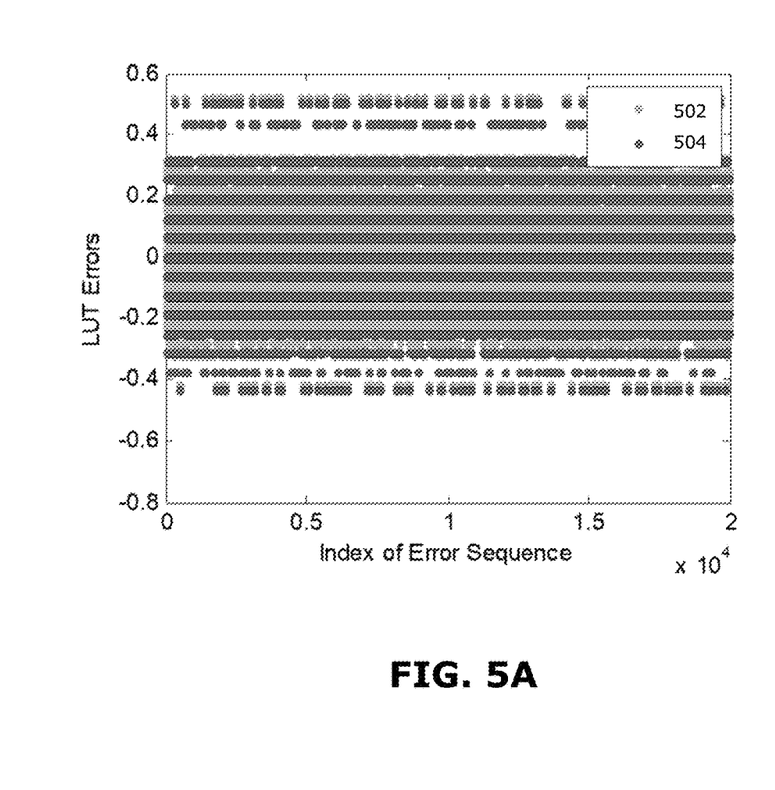
FIG. 5A is a plot of PDLUT distortion correction values with their corresponding quantized values in accordance with a single-step quantization having 15 quantization levels in accordance with exemplary embodiments of the present disclosure.
Figure 5B:
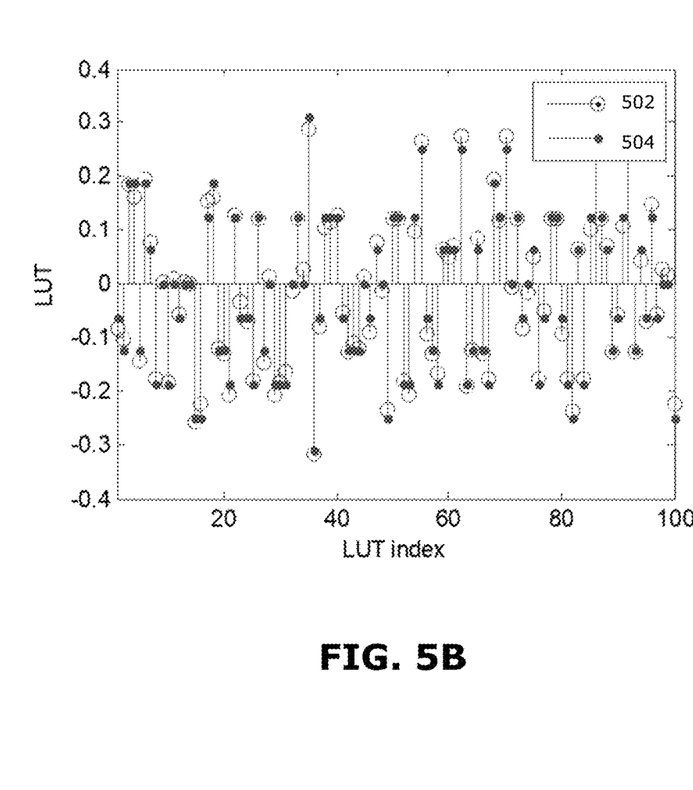
FIG. 5B is an enlarged portion of FIG. 5A.

By way of a non-limiting example, FIG. 5A illustrates PDLUT distortion correction values 502 plotted with their corresponding quantized values 504 in accordance with a single-step quantization with a corresponding FIR filter having 16 input levels. FIG. 5B illustrates an enlarged portion of FIG. 5A, specifically for PDLUT indices ranging from 0 to 100 having distortion correction values ranging between 0.4 and −0.4.

It is understood that the quantization method in step 404 is an exemplary embodiment of the present disclosure, and other methods of quantization may be possible.

Referring back to FIG. 4, at 406, linear compensation is applied, via FIR filters, to the quantized value as well as the Tx signal separately. As known, the speed of the FIR filter, and hence their associated electronic systems, are generally limited by the speed of the tap multiplier. As the resolution of the input signal to the FIR filter increases, the bit-width of the signal increases which results in an increased complexity of multiplication and significant power consumption.

The transmission signal and the quantized value read from the PDLUT 102 may be inputted to separate FIR filters, which may divide the number of arithmetic calculations into smaller numbers, resulting in faster computational time and power consumption savings.

At 410, the linearly compensated quantized values and the linearly compensated signal are then combined, such as through an adder, to form the pre-corrected signal for transmission. The combined signal may then be forwarded to one or more components of the transmitter 12 for transmission to the receiver 14.

Figure 6:
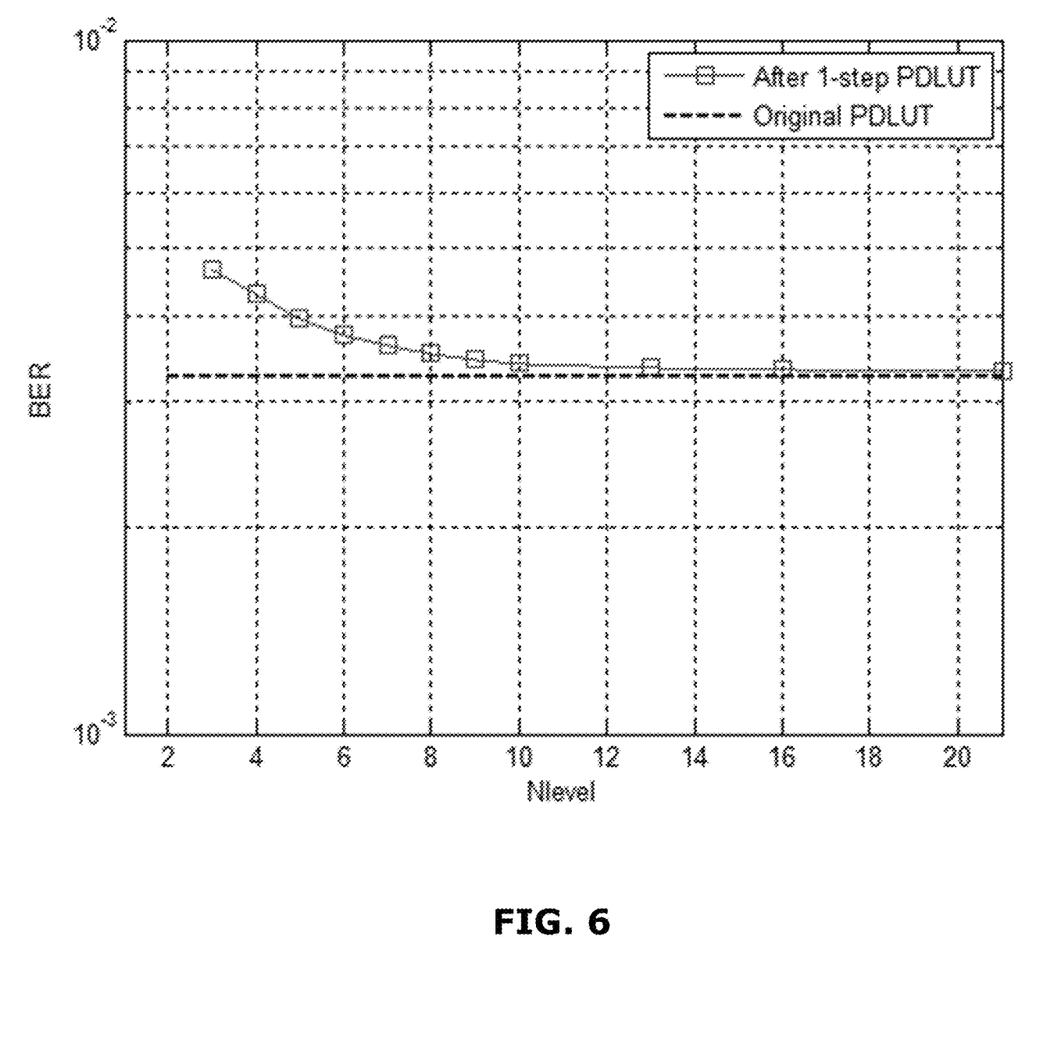
FIG. 6 is a plot of the Bit Error Rate (BER) as a function of numbers of quantization levels for a one-step quantization compared to that of a PDLUT without quantization.

The rounding in step 404 leads to a quantization error. This quantization error is exacerbated when the distortion correction value range increases which in turn causes the scale factor, or the incremental distortion correction value between quantization levels, to increase. FIG. 6 illustrates a plot of the Bit Error Rate (BER) as a function of numbers of FIR filter input levels ($N_{level}$) for a one-step quantization compared to that of a PDLUT without quantization. As may be observed from FIG. 6, the BER is higher for lower number of FIR filter input levels. As the number of FIR filter input level increases, the resulting quantization values more closely approximates the original PDLUT distortion correction values, and the rounding error during quantization is minimized leading to improved BER. However, increased FIR filter input levels results in computational complexity and increased power consumption. In addition, the increase in FIR filter input levels provides diminishing return on the BER improvement. Thus, in some embodiments of the present disclosure, a multi-step quantization method is implemented to provide identical accuracy performance (i.e. BER or RMS or error value) while using FIR filters with relatively lower number of input levels.

Figure 7:
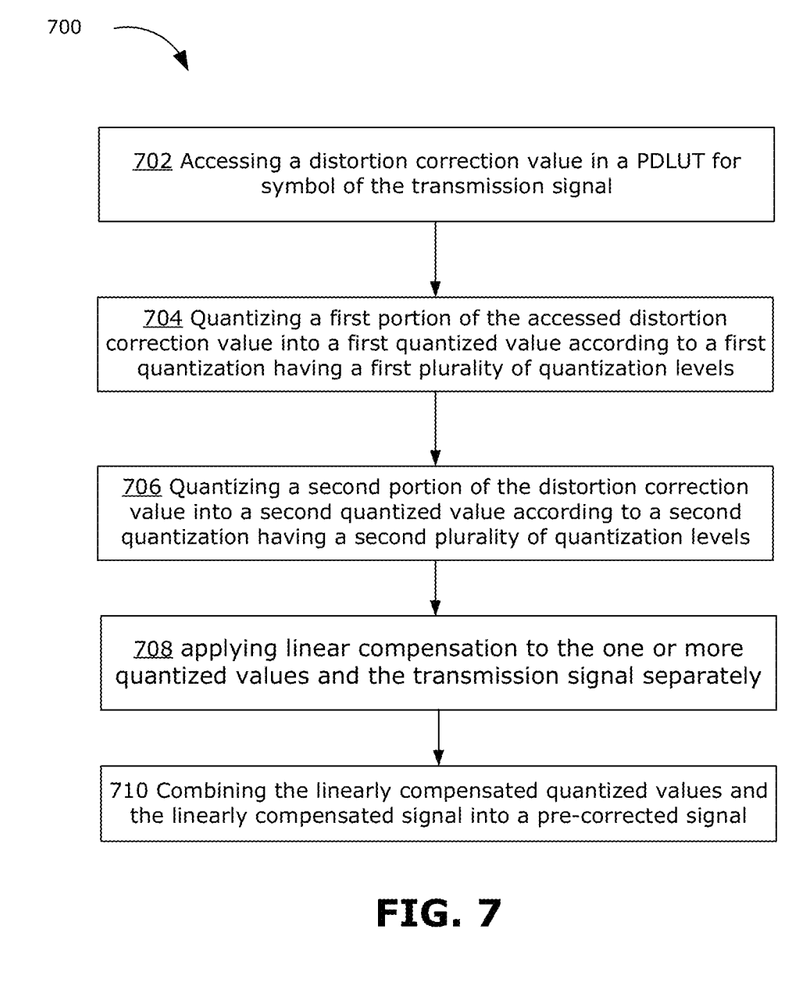
FIG. 7 is a flowchart of a two-stage PDLUT compensation method in accordance with exemplary embodiments of the present disclosure.

FIG. 7 is a flowchart of a two-stage PDLUT compensation method 700 in accordance with exemplary embodiments of the present disclosure. In exemplary method 700, the total quantization is divided into two quantization steps where each quantization has less number of quantization levels while maintaining accuracy performance.

At 702, an input transmission signal sequence is inputted to a PDLUT 102. An index for accessing a corresponding register of a PDLUT 102 to read a non-linear correction error value is generated similar as that of step 402 of method 400 and won't be described here for brevity.

At 704, a first portion of the distortion correction value accessed from PDLUT 102 ($\Delta$) is quantized into a first quantized value according to a first quantization.

A first scale factor, representative of the amount of incremental increase in distortion correction value between adjacent quantization levels of the first quantization may be determined in accordance with Equation (5) as:

$$scaleFactor_1 = \frac{\max(\Delta) - \min(\Delta)}{N_{level\_1} - 1} \qquad \text{Equation (5)}$$

Where $\max(\Delta)$ is the maximum distortion correction value stored in the PDLUT 102, $\min(\Delta)$ is the minimum distortion correction value stored in the PDLUT 102, and $N_{level\_1}$ is the number of input levels of a first FIR filter configured to receive the first quantized value, or the first quantization levels. In some embodiments, the first number of FIR input levels may be even or odd without requirement that they are symmetrically located about a 0-level.

The first quantized value may be determined in accordance with Equation (6) as:

$$\Delta_{Q1} = \text{ROUND}\left(\frac{\Delta}{scaleFactor_1}\right) \cdot scaleFactor_1 \qquad \text{Equation (6)}$$

Where $\Delta$ is the distortion correction value accessed from PDLUT 102, and "ROUND" is a function rounding to the nearest integer, and $\Delta_{Q1}$ is the first quantized value. Other rounding methods, such as rounding to the near power of two so as to enable simple bit shifting, may be adopted.

At 706, a second portion of the distortion correction value ($\Delta$) is quantized into a second quantized value ($\Delta_{Q2}$) according to a second quantization. In some embodiments, the second portion of the distortion correction level is defined as a residual distortion correction value (rCorrection). The residual distortion correction value may be determined as the difference between the distortion correction value accessed from the PDLUT 102 and the first quantized value as per Equation (7):

$$r\text{Correction} = \Delta - \Delta_{Q1} \qquad \text{Equation (7)}$$

Conceptually, the residual distortion correction value represents the quantization error of the first quantization, which may be significant especially for large distortion correction ranges and low number of first quantization levels.

A second scale factor, representative of the amount of incremental increase in distortion correction value between adjacent quantization levels in the second quantization may be determined in accordance with Equation (8) as:

$$scaleFactor_2 = \frac{scaleFactor_1}{N_{level2}} \qquad \text{Equation (8)}$$

Where the first scale factor ($scaleFactor_1$) represents the peak-to-peak (i.e. the maximum) residual distortion correction value (rCorrection), and $N_{level2}$ is the number of input levels of a second FIR filter configured to receive the second quantized value, or the second quantization levels. The second quantized value ($\Delta_{Q2}$) for the second quantization may be determined in accordance with Equation (9) as:

$$\Delta_{Q2} = \text{ROUND}\left(\frac{r\text{Correction}}{scaleFactor_2}\right) \cdot scaleFactor_2 \qquad \text{Equation (9)}$$

Where "ROUND" is a function rounding to the nearest integer value. It is understood that other methods of rounding, such as rounding to the near power of two so as to enable simple bit shifting, may be adopted. Due to the randomness of the first quantization (i.e. rounding down or round up to each quantization level), the residual distortion correction values are statistically symmetrical about the mean value of $$\frac{scaleFactor_1}{2}.$$

Hence, in some embodiments, to ensure improved resolution and efficiency, the second FIR filter is configured with a symmetrical input level distribution where the second number of FIR input levels includes an odd number of levels ($N_{level2}$) with one input level at 0 and the remaining input levels evenly distributed about the 0 level that may be determined using Equations (4) and (5).

In some other embodiments, the second FIR filter may be configured with an even number of input levels symmetrically distributed within the range of $scaleFactor_1$ that may not have a 0-input level. In such case, the second scale factor may be determined as follows:

$$scaleFactor_2 = \frac{scaleFactor_1}{2 * N_{level2}} \qquad \text{Equation (10)}$$

The second quantized value may then be determined in accordance with Equation (11) as:

$$\Delta_{Q2} = \left(\text{ROUND}\left(\frac{\frac{r\text{Correction}}{scaleFactor_2} - 1}{2}\right) * 2 + 1\right) scaleFactor_2 \qquad \text{Equation (11)}$$

Effectively, the first quantization step 704 quantizes a distortion correction value on a relatively coarse scale based on $scaleFactor_1$. Due to the less precise resolution of the first quantization, the error derived from rounding off values (i.e. the quantization error) in the first quantization step 704 is captured by the residual distortion correction value which is further quantized on a more precise scale, namely $scaleFactor_2$, which is $\frac{1}{N_{level2}}$ th of the first quantization scale. The second quantization, in one aspect, reduces the quantization error from the first quantization in a quantized fashion so as to permit FIR filter computational efficiency.

It is understood that the quantization method in steps 704 and 706 is an exemplary embodiment of the present disclosure, and other methods of quantization may be possible.

At 708, linear compensation is applied to the first and second quantized values, as well as the Tx signal, independent of one other via separate FIR filters.

At 710, the linearly compensated quantized values and the linearly compensated signal are then combined, such as through an adder, to form the pre-corrected signal for transmission. The power consumption of an adder is negligible compared to that of a FIR filter and therefore the introduction of the adder does not contribute significantly to the power consumption of the overall system. The combined signal may then be forwarded to one or more components of the transmitter 12 for transmission to the receiver 14.

It is understood that although it is shown with a two-step PDLUT quantization, method 700 may be applied mutatis mutandis to quantization methods with three or more quantization.

Figure 8A:
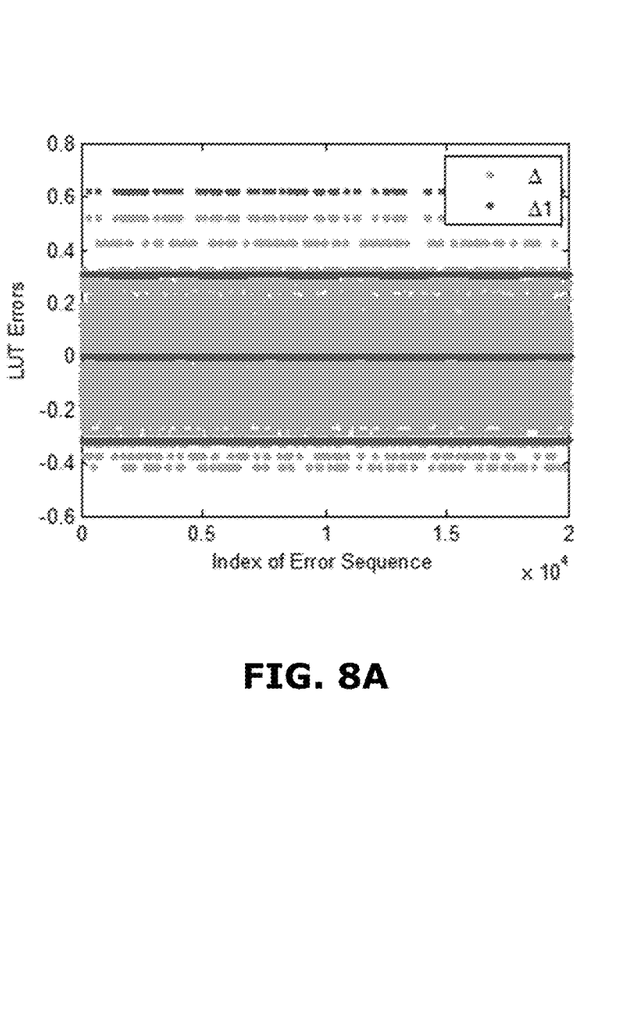
FIGS. 8A and 8B show the same set of PDLUT distortion correction values from FIG. 5A processed as a result of a two-step PDLUT quantization method in accordance with the present disclosure.
Figure 8B:
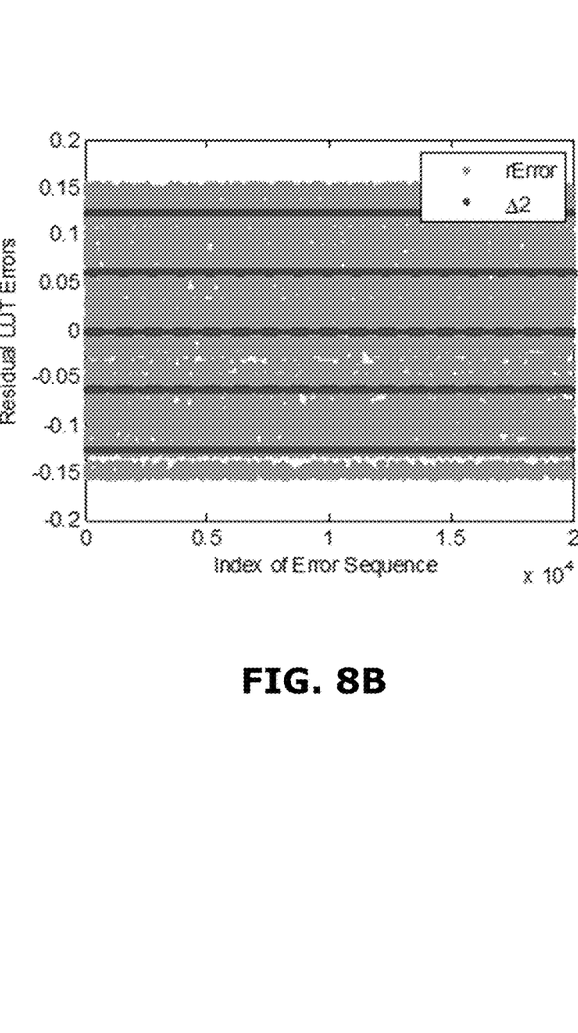

FIGS. 8A and 8B show the same set of PDLUT distortion correction values from FIG. 4A processed as a result of a two-step PDLUT quantization method (i.e. method 700) in accordance with the present disclosure. FIG. 8A illustrates a first FIR filter having four (4) input levels that are unsymmetrically distributed about the 0-level (i.e. two levels above and one level below). FIG. 8B illustrates a second FIR filter having five (5) input levels. As may be discerned from FIG. 8B, the residual correction value ranges from 0.15 to −0.15 for each of the first quantization levels and the values are symmetrically distributed about the middle value of 0. The Root Mean Square (RMS) value of the residual correction value from the second quantization shown in FIG. 8B is identical to that of the one-step quantization in FIG. 5A, namely 0.0176. Hence, the relationship between the number of quantization levels in a single-step PDLUT quantization and a multi-step PDLUT quantization in accordance with the present disclosure may be determined as follows:

$$N_{level\_Single} = (N_{level1} - 1)(N_{level2}) \ldots (N_{leveln}) + 1 \quad \text{Equation (12)}$$

Where $N_{level\_Single}$ is the number of quantization levels from a single step quantization, $N_{level1}$ is the number of quantization levels in a multi-step quantization, n is the total number of quantization, the +1 accounts for the 0 input level. In the example shown in FIGS. 5A, 5B, and 8A, 8B, the 16-level single-step quantization corresponds to the product of the number of input levels from the two-stage quantization method in accordance with Equation (12) (i.e. 16=(4−1)(5)+1). As a further example, a 19-level single-stage PDLUT quantization may be converted to a 3-stage quantization where each of the first, second, and third quantization has 3 corresponding FIR filters having input levels 3, 3, and 3, respectively such that 19=(3−1)(3)(3)+1.

The number of FIR filter input levels may be selected based on the severity of the non-linearity distortion inherent in the system. For a large values of peak-to-peak (i.e. maximum to minimum) non-linearity distortion, more FIR filter input levels may be needed such that the rounding error caused by the quantization process may be minimized. Alternatively, for small peak-to-peak non-linearity distortion, fewer FIR filter input levels may suffice. Thus, in some embodiments, the total number of FIR filter input levels may depend on the error range and a desired performance metric. Once the total number of FIR filter input levels is determined, it may be converted to a multi-step quantization in accordance with Equation (6). For example, it may not be possible to implement a 18-level single stage quantization, and in order to implement a multi-stage quantization in accordance with the present disclosure, the nearest possible single stage quantization level, namely 18, may be needed. In some embodiments, a 19-level single step quantization may not have a corresponding two-step quantization available due to the availability of FIR filters, and may need to be converted to a three-step quantization with a 3-input level first FIR filter, a 3-input level second FIR filter, and a 3-input level third FIR filter (i.e. 19=(3−1)(3)(3)+1). If power consumption of a 3-level quantization is undesirable, a 16-level two stage quantization (i.e. a 4-input level first FIR filter and a 5 input level second FIR filter) may be considered.

For two-step PDLUT quantization methods, since the number of the first plurality of FIR filter input levels (m) and the number of the second plurality of FIR filter input levels (n) are equal to or greater than 3, then (m−1)+n<(m−1)n, and the minimum of (m−1)n is 6. Therefore, in some embodiments, for a one-step PDLUT quantization having more than 6 FIR filter input levels, the corresponding 2-step PDLUT quantization may achieve the same performance in terms of accuracy while reducing the resolution of the FIR filters and thus saving power.

By adopting a multi-step quantization, the FIR filter input levels corresponding to each quantization are reduced, thereby reducing the multiplier operation within the respective FIR filters, resulting in a decrease in power consumption without a decrease in performance.

Figure 9:
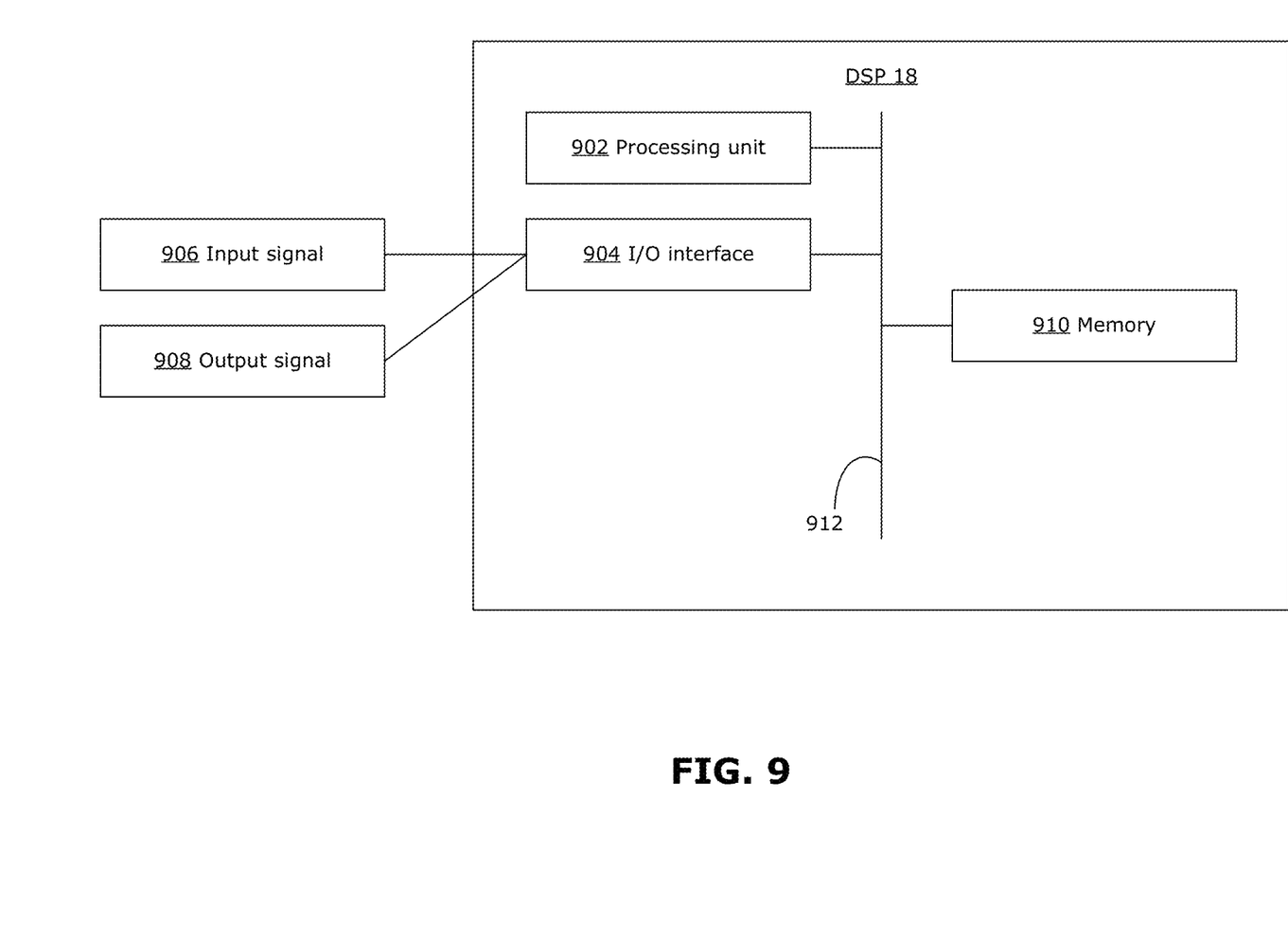
FIG. 9 is a block diagram of an example hardware structure of the Tx DSP 18 in FIG. 1.

FIG. 9 is a block diagram illustrating an example hardware structure of the Tx DSP 18, in which the PDLUT module 100 is implemented. Other computing system suitable for implementing embodiments described in the present disclosure may be used, which may include components different from those discussed below. In some examples, the Tx DSP 18 may be implemented across more than one physical hardware unit, such as in a parallel computing, distributed computing, virtual server, or cloud computing configuration. Although FIG. 9 shows a single instance of each component, there may be multiple instances of each component in the Tx DSP 18.

In FIG. 9, the Tx DSP 18 comprises a processing unit 902, an Input/Output (I/O) interface 904, and a memory 910.

The Tx DSP 18 may include one or more processing device(s) 902, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The Tx DSP 18 may also include one or more input/output (I/O) interfaces 904, which allows Tx DSP 18 to receive input digital signals 906 from signals sources such as a signal generator (not shown) as well as Rx feedback signal 35 during calibration. The I/O interfaces 904 may also transmit processed digital signals 908, such as compensated transmission signal, for further processing in system 10.

The memory 910 may include a volatile or non-volatile memory. Examples of non-transitory computer readable media include a RAM, a ROM, an erasable programmable ROM (EPROM), an electrically erasable programmable ROM (EEPROM), a flash memory, a CD-ROM, or other portable memory storage. The non-transitory memory 910 may store instructions for execution by the processing unit 902, such as to carry out methods or processes described in the example of the present disclosure. The memory 910 may include other software instructions, such as for implementing an operating system and other applications/functions.

In the Tx DSP 18, among other components, the PDLUT module 100 may be implemented by the processing unit 902 and memory 910.

The bus 912 providing communication channels among components of the Tx DSP 18, including the processing unit 902, I/O interface 904, and/or memory 910. The bus 912 may be any suitable bus architecture including, for example, a memory bus, or a peripheral bus.

In some embodiments, to further reduce power consumption, the quantized values of each distortion correction value in the PDLUT may be pre-calculated. For example, in some embodiments, the distortion correction values may be converted to their corresponding quantized values during the calibration phase and stored within PDLUT. Thus, during pre-correction, the index value generated from each signal may be used to access a quantized value stored in the PDLUT 102 and no computational power may be expended on the calculation of the quantized values.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A method of pre-correction of a signal comprising a sequence of symbols using a Pattern Dependent Look-up Table (PDLUT) containing one or more distortion correction values, the method comprising:
   accessing a distortion correction value from the PDLUT for a symbol of the sequence of symbols;
   quantizing the accessed distortion correction value into one or more quantized values according to one or more quantizations to reduce a bit-width of the distortion correction value;
   applying linear correction compensations to the one or more quantized values and the signal separately, where the one or more quantized correction values with reduced bit-width reduce a number of calculation steps performed during linear correction compensation; and
   combining the linearly compensated quantized values and the linearly compensated signal into a pre-corrected signal.

2. The method of claim 1, wherein the quantizing further comprises:
   quantizing the accessed distortion correction value into a first quantized value according to a first quantization; and
   quantizing a second portion of the distortion correction value into a second quantized value according to a second quantization, wherein the second portion of the distortion correction value is a difference between the accessed distortion correction value and the first quantized value.

3. The method of claim 2, wherein the applying further comprises:
   providing the first quantized value to a first finite impulse response (FIR) filter having a first plurality of input levels;
   providing the second quantized value to a second FIR filter having a second plurality of input levels; and
   providing the signal to a third FIR filter.

4. The method of claim 2, wherein the quantizing the first portion of the distortion correction value includes:
   determining a first scale factor representative of a distortion correction value difference between adjacent quantization levels of the first quantization as $$scaleFactor_1 = \frac{\max(\Delta) - \min(\Delta)}{N_{\text{level}\_1} - 1},$$

where $\max(\Delta)$ is a maximum distortion correction value, $\min(\Delta)$ is a minimum distortion correction value, and $N_{level}$ is a first plurality of quantization levels of the first quantization; and
   determining the first quantized value ($\Delta_{Q1}$) as $$\Delta_{Q1} = \text{ROUND}\left(\frac{\Delta}{scaleFactor_1}\right) \cdot scaleFactor_1,$$

where ROUND is a rounding function, and $\Delta$ is the accessed distortion correction value.

5. The method of claim 4, wherein the first plurality of quantization levels is an even or odd number of levels.

6. The method of claim 4, wherein the quantizing the second portion of the distortion correction value includes:
determining a second scale factor representative of a distortion correction value difference between adjacent quantization levels of a second quantization as $$scaleFactor_2 = \frac{scaleFactor_1}{N_{level2}},$$

where $N_{level2}$ is the second plurality of quantization levels of the second quantization;
determining a distortion correction value as rCorrection=$\Delta-\Delta_{Q1}$; and
determining the second quantized value as $$\Delta_{Q2} = ROUND\left(\frac{rCorrection}{scaleFactor_2}\right) \cdot scaleFactor_2,$$

where ROUND is a rounding function.

7. The method of claim 6, the second plurality of quantization levels is an odd number of levels.

8. The method of claim 7, the second plurality of quantization levels includes a 0 quantization level, and remaining levels of the second plurality of levels are symmetrically distributed about the 0 quantization level.

9. The method of claim 4, wherein the quantizing the second portion of the distortion correction value includes:
determining a second scale factor representative of a distortion correction value difference between adjacent quantization levels of a second quantization as $$scaleFactor_2 = \frac{scaleFactor_1}{2N_{level2}},$$

where $N_{level2}$ is a second plurality of quantization levels of the second quantization;
determining a distortion correction value as rCorrection=$\Delta-\Delta_{Q1}$; and
determining the second quantized value as $$\Delta_Q = \left(ROUND\left(\frac{\frac{rCorrection}{scaleFactor_2}-1}{2}\right) \cdot 2 + 1\right) \cdot scaleFactor_2,$$

where ROUND is a rounding function.

10. The method of claim 9, wherein the second plurality of quantization levels is an even number of levels.

11. The method of claim 1, wherein the accessing further comprises:
for each symbol in the sequence of symbols, selecting a number of consecutive symbols with the each symbol as a center symbol;
forming an index based on the number of symbols; and
retrieving, using the index, a distortion correction value from the PDLUT.

12. The method of claim 1, wherein the one or more quantized values of the one or more distortion correction values are pre-calculated and stored into the PDLUT, and the pre-calculated quantized values are accessed and applied to the signal directly.

13. The method of claim 1, wherein the quantizing includes one quantization and linear compensation is applied by a finite impulse response (FIR) filter having an odd number of input levels, the quantizing further comprises:
determining a scale factor representative of a distortion correction value difference between adjacent input levels of the $$FIR \text{ filter as } scaleFactor = \frac{\max(\Delta)-\min(\Delta)}{N_{level}-1},$$

where $\max(\Delta)$ is a maximum distortion correction value, $\min(\Delta)$ is a minimum distortion correction value, and $N_{level}$ is the odd number of input levels of the FIR filter; and
determining the quantized value ($\Delta_Q$) as $$\Delta_Q = ROUND\left(\frac{\Delta}{scaleFactor}\right) \cdot scaleFactor,$$

where ROUND is a rounding function, and A is the accessed distortion correction value.

14. The method of claim 1, wherein the quantizing includes one quantization and linear compensation is applied by a finite impulse response (FIR) filter having an even number of input levels, the quantizing further comprises:
determining a scale factor representative of a distortion correction value difference between adjacent input levels of the FIR filter as $$scaleFactor = \frac{\max(\Delta)-\min(\Delta)}{2N_{level}},$$

where $\max(\Delta)$ is a maximum distortion correction value, $\min(\Delta)$ is a minimum distortion correction value, and $N_{level}$ is the even number of input levels; and
determining the quantized value ($\Delta_Q$) as $$\Delta_Q = \left(ROUND\left(\frac{\frac{\Delta}{scaleFactor}-1}{2}\right) \cdot 2 + 1\right) \cdot scaleFactor,$$

where ROUND is a rounding function, and $\Delta$ is the accessed distortion correction value.

15. The method of claim 1, wherein the quantizing step includes three or more quantizations, the quantization levels of each of the three or more quantizations is determined as $N_{level}=(N_{level1}-1)(N_{level2})\ldots(N_{leveln})+1$, where $N_{level}$ is a plurality of quantization levels of a single quantization, and $N_{leveln}$ is the number of quantization levels of an $n^{th}$ quantization of the three or more quantizations.

16. The method of claim 15, wherein the single quantization and the multiple quantization achieve a same accuracy.

17. A digital signal processor (DSP) for a transmitter, comprising:
a processor configured to:
access a distortion correction value in a Pattern Dependent Lookup Table (PDLUT) for a symbol of a sequence of symbols to be transmitted by the transmitter;
quantize the accessed distortion correction value into one or more quantized values according to one or more quantizations to reduce a bit-width of the distortion correction value;

one or more finite impulse response (FIR) filters configured to apply linear correction compensation to the one or more quantized values and the sequence of symbols, where the one or more quantized correction values with reduced bit-width reduce a number of calculation steps performed during linear correction compensation; and an adder configured to combine the linearly compensated quantized values and the linearly compensated sequence of symbols into a pre-corrected signal.

18. The DSP of claim 17, wherein the processor is further configured to:

quantize a first portion of the distortion correction value into a first quantized value according to a first quantization; and quantize a remaining portion of the distortion correction value into a second quantized value according to a second quantization, wherein the second portion of the distortion correction value is a difference between the accessed distortion correction value and the first quantized value.

19. The DSP of claim 18, wherein the one or more FIR filters includes:

a first FIR filter having a first plurality of input levels configured to receive the first quantized value;

a second FIR filter having a second plurality of input levels configured the received to the second quantized value.

20. The DSP of claim 17, wherein the adder is any one of a half adder, full adder, ripple-carry adder, carry-look-ahead adder, Brent-Kung adder, Kogge-Stone adder, carry-save adder, carry-select adder, and carry-skip adder.

* * * * *